US012306922B2

(12) United States Patent
Talwar et al.

(10) Patent No.: US 12,306,922 B2
(45) Date of Patent: May 20, 2025

(54) SYSTEM AND METHOD TO ACTIVATE A CARD LEVERAGING A VIRTUAL ENVIRONMENT

(71) Applicant: Bank of America Corporation, Charlotte, NC (US)

(72) Inventors: Amardeep Singh Talwar, New Delhi (IN); Sukanya V, Chennai (IN); Shailendra Singh, Thane West (IN); Ashutosh Tripathi, Delhi (IN); Gaurav Sachdeva, Gurugram (IN); Salma Umme, Hyderabad (IN); Sharvani Ganachary, Hyderabad (IN); Shyam Prasad Rokula, Hyderabad (IN); Bhagat Kumar Allugubelly, Hyderabad (IN); Kavitha Hariharan, Chennai (IN); Charles Joseph Fernandez, Hyderabad (IN); Raj Kiran Akkera, Secunderabad (IN); Sarabjeet Kaur, Delhi (IN); Jai Issrani, Benares (IN)

(73) Assignee: Bank of America Corporation, Charlotte, NC (US)

( * ) Notice: Subject to any disclaimer, the term of this patent is extended or adjusted under 35 U.S.C. 154(b) by 340 days.

(21) Appl. No.: 18/053,060

(22) Filed: Nov. 7, 2022

(65) Prior Publication Data

US 2024/0152594 A1    May 9, 2024

(51) Int. Cl.
*G06F 21/34*     (2013.01)

(52) U.S. Cl.
CPC .................... *G06F 21/34* (2013.01)

(58) Field of Classification Search
CPC ....................................................... G06F 21/34
See application file for complete search history.

(56) References Cited

U.S. PATENT DOCUMENTS

| 9,282,377 | B2 | 3/2016 | Bruner |
| 9,424,861 | B2 | 8/2016 | Jerram et al. |
| 9,592,449 | B2 | 3/2017 | Barbalet et al. |
| 10,169,924 | B2 | 1/2019 | Rosenthal et al. |
| 10,289,987 | B1 * | 5/2019 | Walker ................... G07F 19/203 |
| 10,482,664 | B1 * | 11/2019 | Schlosser ........... G06Q 20/3224 |
| 10,540,640 | B1 | 1/2020 | James et al. |

(Continued)

FOREIGN PATENT DOCUMENTS

| WO | WO-2020121063 | A1 * | 6/2020 | ......... G06Q 20/3223 |
| WO | WO-2024143882 | A1 * | 7/2024 | ....... G06K 19/06037 |

*Primary Examiner* — James R Turchen (57) ABSTRACT

An apparatus for activating a physical card in a virtual environment comprises a processor associated with a server. The processor is configured to receive a request to issue a physical card to a first user and to generate a first non-fungible token (NFT) for storage in the physical card, wherein the first NFT is then displayed as a digital card in a virtual environment. The processor is further configured to receive the digital card in an interaction and to generate a second NFT. The processor is further configured to combine the first NFT and the second NFT to generate an activation NFT that allows the physical card to access a profile corresponding to the first user during an interaction. The processor is further configured to transmit the activation NFT and an instruction to the first user device to store the activation NFT in the physical card.

20 Claims, 4 Drawing Sheets

(56) References Cited

U.S. PATENT DOCUMENTS

| | | |
|---|---|---|
| 10,614,661 B2 | 4/2020 | Simons |
| 10,825,004 B1 * | 11/2020 | Walker ................ G06Q 20/321 |
| 10,929,842 B1 | 2/2021 | Arvanaghi et al. |
| 11,017,391 B1 | 5/2021 | Winklevoss et al. |
| 11,139,955 B1 | 10/2021 | So et al. |
| 11,295,318 B2 | 4/2022 | Andon et al. |
| 11,436,581 B1 * | 9/2022 | Walker ................ G07F 19/202 |
| 2014/0122220 A1 | 5/2014 | Bradley et al. |
| 2016/0140460 A1 | 5/2016 | Boyd, Jr. |
| 2018/0047063 A1 | 2/2018 | Tuchman et al. |
| 2018/0150831 A1 * | 5/2018 | Dolan ................ G06Q 20/321 |
| 2018/0157336 A1 | 6/2018 | Harris et al. |
| 2018/0253840 A1 | 9/2018 | Tran |
| 2020/0005284 A1 * | 1/2020 | Vijayan ................ G06Q 20/065 |
| 2020/0042989 A1 * | 2/2020 | Ramadoss ............ G06Q 50/167 |
| 2020/0211409 A1 | 7/2020 | Latorre et al. |
| 2020/0251213 A1 | 8/2020 | Tran et al. |
| 2020/0410758 A1 * | 12/2020 | Hamchuk .......... G06Q 30/0631 |
| 2021/0082044 A1 | 3/2021 | Sliwka et al. |
| 2021/0097281 A9 | 4/2021 | Fish et al. |
| 2021/0118085 A1 | 4/2021 | Bushnell et al. |
| 2021/0256070 A1 | 8/2021 | Tran et al. |
| 2022/0040557 A1 | 2/2022 | Tran |
| 2022/0058630 A1 | 2/2022 | Yantis et al. |
| 2022/0123948 A1 | 4/2022 | Wentz et al. |
| 2022/0207119 A1 | 6/2022 | Andon et al. |
| 2022/0261882 A1 | 8/2022 | Youb et al. |
| 2022/0327303 A1 * | 10/2022 | Carlson ................ G06K 7/1434 |
| 2023/0079195 A1 * | 3/2023 | Matheson .......... G06Q 20/0655 705/44 |
| 2023/0085677 A1 * | 3/2023 | Copeland ................ G06F 21/64 705/66 |
| 2023/0290075 A1 * | 9/2023 | Ma ........................ G06T 19/006 |
| 2023/0313898 A1 * | 10/2023 | Carpenter ................ F16L 41/03 137/512 |
| 2024/0273603 A1 * | 8/2024 | Saunkeah .......... G06Q 30/0631 |

* cited by examiner

SYSTEM AND METHOD TO ACTIVATE A CARD LEVERAGING A VIRTUAL ENVIRONMENT

TECHNICAL FIELD

The present disclosure relates generally to network communications and information security. More particularly, in certain embodiments, the present disclosure is related to a system and method for activating a card in a virtual environment.

BACKGROUND

In a network environment, user devices are in data communication with other user devices that may be distributed anywhere in the world. These network environments allow data and information to be shared among these devices. Some of the technical challenges that occur when data is exchanged between devices are controlling data leakage, unauthorized access to data, and preventing malicious activities. It is challenging to control unauthorized access to data visually available on a physical card.

SUMMARY

The system and methods described in the present disclosure provide technical solutions to the technical problems discussed above by allowing a user to securely access a virtual environment and perform a card activation procedure in the virtual environment. The disclosed system and methods provide several practical applications and technical advantages.

For example, the disclosed system and methods provide the practical application of improving interoperability of real-world systems and virtual world systems (e.g., metaverse systems) so that information may be seamlessly shared between these systems to implement data security, authorization of data interactions, and access to real-world and virtual resources. Typically, a physical card issued to a user is delivered wherein card information is visually exposed to the external environment. The present system and methods provide an example where the card information is stored as a non-fungible token in the physical card, and the user can activate the physical card through an interaction in a virtual environment.

The system described in the present disclosure is particularly integrated into a practical application of improving the data security. By storing card information as a non-fungible token and activating the physical card through the virtual environment, the card information and user information are kept secured from unauthorized access. For example, if a bad actor impersonates a user, the bad actor may request issuance of a new physical card that does not have adequate authorization procedures in place to activate. In an example, the bad actor may call a number or access a website and enter the card information displayed on the physical card in order for activation.

The disclosed system is configured to prevent the aforementioned example by storing the card information in the physical card as an NFT accessible by a user in the virtual environment rather than having the card information visually displayed on the physical card. The disclosed system is configured to activate the physical card to allow access to a profile corresponding to that user by having the user interact with an established entity in the virtual environment.

In an embodiment, an apparatus for activating a physical card in a virtual environment comprises a memory and a processor. The memory is operable to store a profile associated with a first user comprising user information. The processor is operably coupled to the memory and configured to receive a request to issue the physical card to the first user and to generate a first non-fungible token (NFT) for storage in the physical card, wherein the first NFT comprises card information and a portion of the user information associated with the first user. The first NFT is uploaded to a first user device associated with the first user through a communication link established between the first user device and the physical card, wherein the first NFT is displayed as a digital card in the virtual environment, wherein the digital card corresponds to the physical card. The processor is further configured to receive the digital card in an interaction with a first avatar associated with the first user and to generate a second NFT comprising a remaining portion of the user information associated with the first user in response to receiving the digital card. The processor is further configured to combine the first NFT and the second NFT to generate an activation NFT, wherein the activation NFT is configured to allow the physical card to access the profile during an interaction. The processor is further configured to transmit the activation NFT and an instruction to the first user device to store the activation NFT in the physical card.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
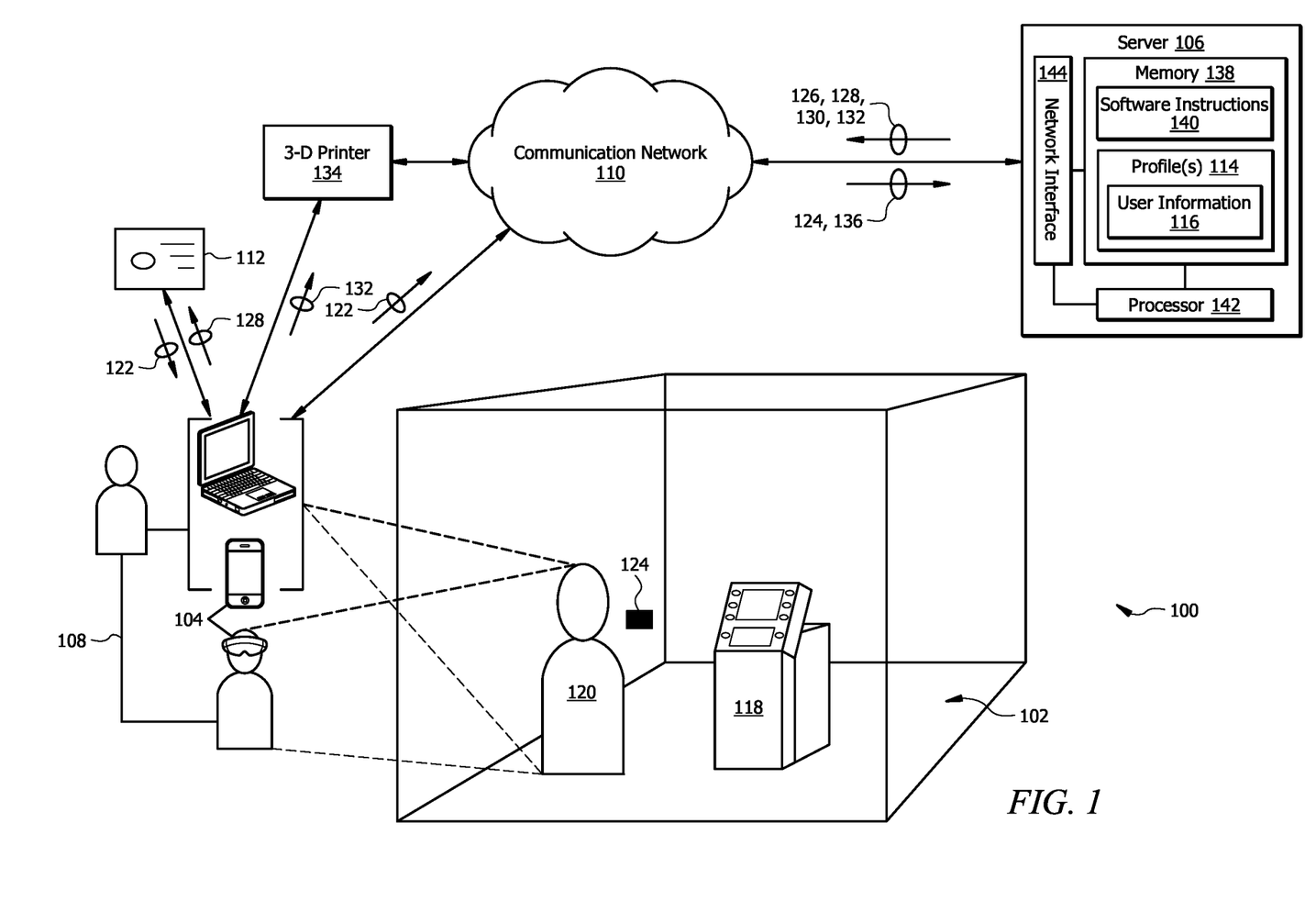
FIG. 1 is a schematic diagram of an example system for activating a physical card in a virtual environment.
Figure 2:
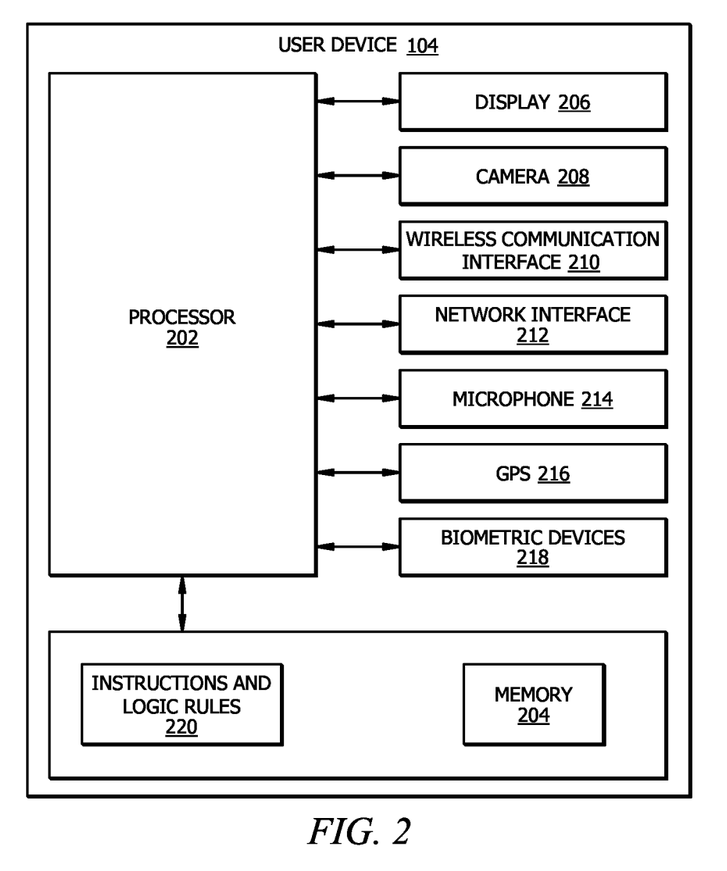
FIG. 2 is a block diagram of an example user device of the system of FIG. 1.
Figure 3:
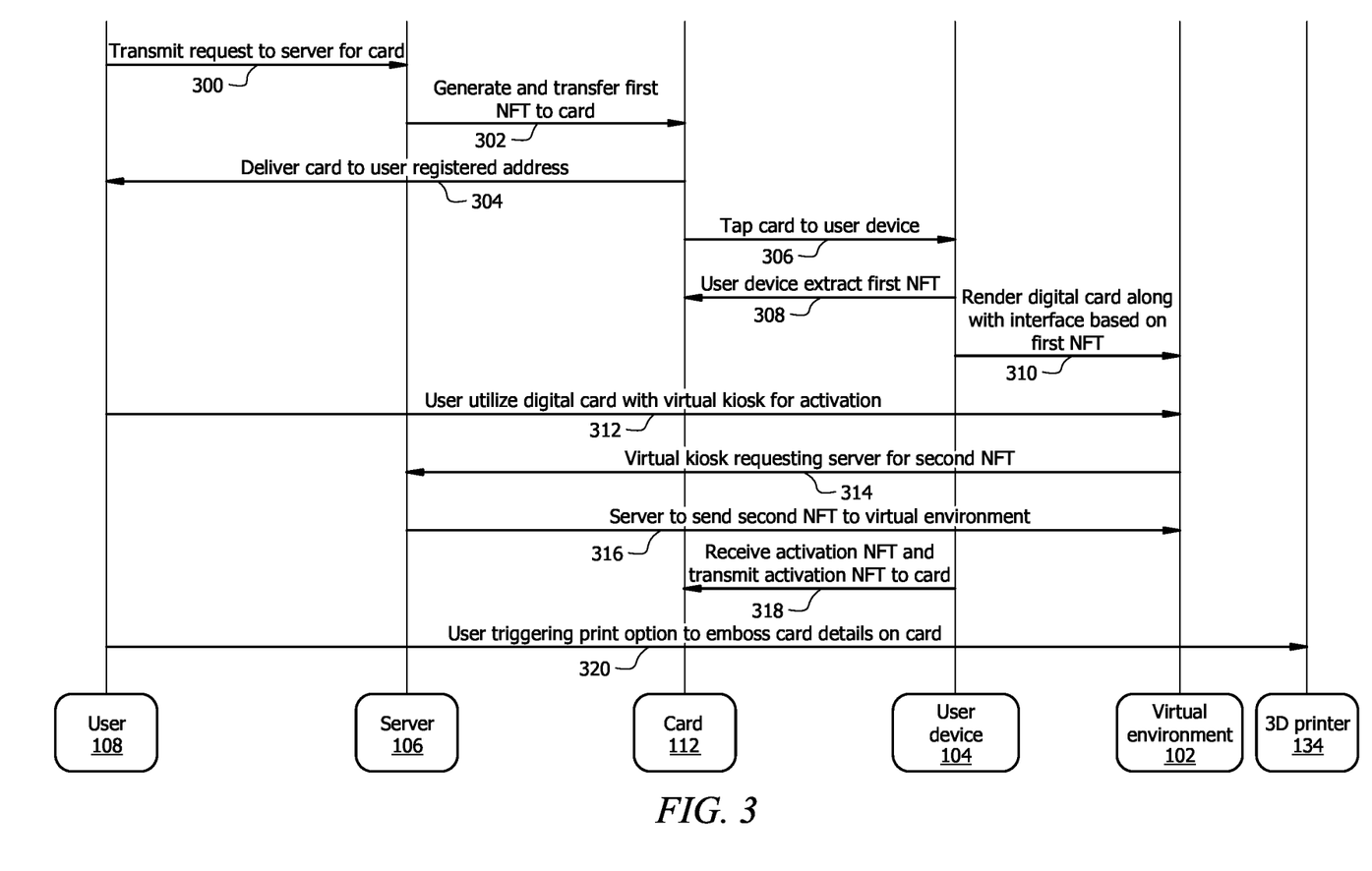
FIG. 3 is a traffic relay message flow diagram illustrating an example operation of the system of FIG. 1.
Figure 4:
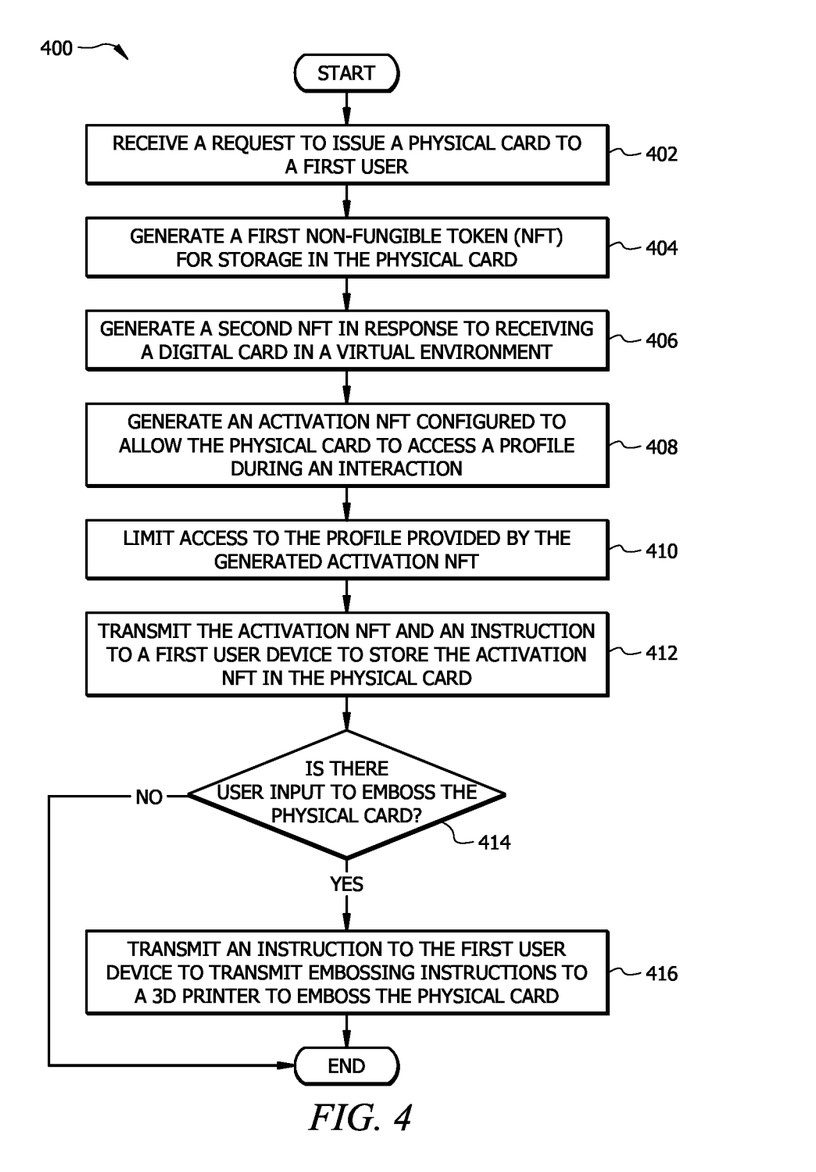
FIG. 4 is a flow diagram illustrating an example operation of a server of the system of FIG. 1.

This disclosure provides solutions to the aforementioned and other problems of previous technology by activating a physical card using non-fungible tokens in a virtual environment. FIG. 1 is a schematic diagram of an example system for activating a physical card in a virtual environment. FIG. 2 is a block diagram of an example user device of the system of FIG. 1. FIG. 3 is a traffic relay message flow diagram illustrating an example operation of the system of FIG. 1. FIG. 4 is a flow diagram illustrating an example operation of a server of the system of FIG. 1.

Example System for Activating a Physical Card Leveraging a Virtual Environment FIG. 1 illustrates a schematic diagram of an example system 100 that is generally configured to activate a physical card in a virtual environment 102. The system 100 may include a first user device 104 and a server 106. A first user 108 is associated with the first user device 104. The system 100 may be communicatively coupled to a communication network 110 and may be operable to transmit data between the first user device 104 and the server 106 through the communication network 110. In general, the system 100 may improve electronic interaction technologies by transmitting non-fungible tokens ("NFTs") between a physical card 112 associated with the first user 108 and the server 106 through the virtual environment 102. This process provides improved information security because it provides a secure mechanism to activate the physical card 112 ensuring minimal or zero account information exposure on the delivered, physical card 112.

For example, in a particular embodiment, a user (for example, the first user 108) may receive a physical card 112 issued by the server 106. The first user 108 may have transmitted a request to the server 106 to provide a new physical card 112, and the server 106 may have delivered the physical card 112 to the first user 108 in a real-world environment through any suitable means. The physical card 112 may correspond to a profile 114 associated with the first user 108, wherein the profile 114 may comprise user information 116. In embodiments, user information 116 may be any suitable information relating to the identity of the user, such as legal name, social security number, biometrics (e.g., fingerprints, retina scans, face ID etc.), residence address, phone numbers, email addresses, digital assets owned by the user, copies of government issued documents (e.g., state identity card etc.), account information for one or more accounts, device information associated with a user device, and user credentials associated with the user required to access the virtual environment 102.

The first user 108 may attempt to utilize the physical card 112 in an interaction in a real-world environment or in the virtual environment 102 with an entity 118 as the physical card 112 corresponds to the profile 114 of the first user 108. The first user 108 may receive virtual and/or real resources in response to permitting the entity 118 access to the profile 114 via the physical card 112. The physical card 112 may need to be activated before being used in an interaction. Otherwise, the entity 118 may not be able to access the profile 114, and the interaction will not proceed.

The server 106 may initiate an activation procedure requiring the first user 108 to activate the physical card 112 by using NFTs in the virtual environment 102. For example, the server 106 may deliver the physical card 112 to the first user 108 having stored a first NFT, wherein the first NFT may comprise card information and a portion of the user information 116 associated with the first user 108. The card information may correspond to and be provided by the physical card 112. In embodiments, the card information may include a card number, expiration date, user identity, security code, and the like. The server 106 may have generated the first NFT for storage in the physical card 112 in response to receiving the request to issue the physical card 112 to the first user 108. Without limitations, any suitable protocols may be utilized to generate the NFT. In embodiments, the server 106 may be configured to generate NFTs using EIP-3664 or any other suitable method. To activate the physical card 112 for use in an interaction, the first user 108 may need to further obtain a second NFT in the virtual environment 102.

The first user 108 may access the virtual environment 102 through the first user device 104. The first user device 104 is configured to display a two-dimensional (2D) or three-dimensional (3D) representation of the virtual environment 102 to the first user 108. Examples of a virtual environment 102 may include, but are not limited to, a graphical or virtual representation of a metaverse, a map, a building interior, a landscape, a fictional location, an alternate reality, or any other suitable type of location or environment. The virtual environment 102 may be configured to use realistic or non-realistic physics for the motion of objects within the virtual environment 102. For example, some virtual environments 102 may be configured to use gravity whereas other virtual environments 102 may not be configured to use gravity. Within the virtual environment 102, each user may be associated with an avatar. As illustrated, a first avatar 120 may be associated with the first user 108. An avatar is a graphical representation of the user at a virtual location within the virtual environment 102. Examples of an avatar may include, but are not limited to, a person, an animal, or an object. In some embodiments, the features and characteristics of the avatar may be customizable and user-defined. For example, the size, shape, color, attire, accessories, or any other suitable type of appearance features may be specified by a user. In embodiments, the virtual location of the avatar may be correlated to a physical location of a user in the real-world environment. By using an avatar, a user is able to move within the virtual environment 102 to interact with another avatar and objects (such as entity 118) within the virtual environment 102 while independently remaining at the physical location or being in transit in the real-world environment.

In embodiments, the first user 108 may be required to sign into a secure portal to perform a registration procedure prior to engaging in a virtual environment session. The registration procedure may include generating the first avatar 120 and assigning the first avatar 120 to the first user 108. After the registration procedure, the first user 108 may continue to sign into the secure portal to engage in the virtual environment 102 in any subsequent virtual environment session. In embodiments, a virtual environment session may be referred to as a period of activity by the first user 108 within the virtual environment 102. Each virtual environment session may be separate and distinct. The secure portal may provide access to the virtual environment 102 by employing single sign-on (SSO), multifactor authentication, or any other suitable authentication scheme in order to allow the first user 108 access to the virtual environment 102.

While engaging in the virtual environment 102 via the first avatar 120, the first user 108 may attempt to interact with the entity 118. Entity 118 may be present at different locations in the virtual environment 102. For example, an entity 118 may be a virtual representation of a physical entity in the virtual environment 102. For example, an entity 102 may be a virtual store, a virtual office, and the like. Likewise, a physical entity may be a physical store, a physical office, and the like associated with the same virtual entity. The entity 118 may provide virtual objects and/or services (e.g., resources and data objects) to avatars and users (i.e., first avatar 120 and first user 108). When the user receives a virtual object and/or a service from the entity 118, it may be reflected in the real world. Further, the user may want to transfer data objects to the virtual entity 118, and this may reflect in the real world as well. For example, when a data object is transferred from the user (e.g., from the first avatar 120) to the entity 118, the data object (or an equivalent representation of the data object) may be transferred to the respective physical entity (e.g., to a database associated with physical entity).

In this example, the first user 108 may attempt to engage in an interaction with the entity 118 through the first avatar 120 to activate the physical card 112 in the real-world environment. This interaction may include an exchange of virtual resources and/or real-world resources. For example, the first avatar 120 may request a second NFT needed for activation of the physical card 112 from the entity 118, and the entity 118 may provide the second NFT to the first avatar 120 in response to receiving the first NFT, wherein the second NFT corresponds to the first NFT.

For example, the entity 118 may transmit a request to receive the first NFT from the first avatar 120. The first user device 104 may receive and display the request to the first user 108. The first user 108 may upload the first NFT from the physical card 112 to the virtual environment 102 for use during the interaction with the entity 118 and/or for subsequent interactions in the virtual environment 102. The first user 108 may bring the physical card 112 within physical proximity to the first user device 104. A communication link may be established between the physical card 112 and the first user device 104 thereby allowing communications between each other. Without limitations, any suitable communication link may be used, such as near field communications protocols or Li-Fi protocols. Once communicatively coupled, the first user device 104 may receive the first NFT 122 from the physical card 112 that was generated by server 106 and stored in the physical card 112. In response to receiving the first NFT 122, the first user device 104 may transmit the first NFT 122 to the virtual environment 102 for use by the first avatar 120 in the interaction.

The first user device 104 may be configured to assign the first NFT 122 to the first avatar 120. In embodiments, the first NFT 122 may be displayed to the first user 108 during that virtual environment session as a digital card 124, wherein the digital card 124 corresponds to the physical card 112 in the real-world environment. The digital card 124 may be generated based on the card information provided in the first NFT 122, wherein the visual appearance of the digital card 124 may be based on the provided card information. For example, if the card information includes a card number for the physical card 112 and a color of the physical card 112, the digital card 124 may be displayed having the same card number and color as the physical card 112. The digital card 124 may be displayed through a user interface corresponding to interactions with the first avatar 120. In other embodiments, the digital card 124 may be displayed as a non-fungible token, wherein the non-fungible token may be generated to have the same visual appearance as the physical card 112 in the real-world environment. The digital card 124 may be available for use in the virtual environment 102 within the same virtual environment session in which it was generated.

During the interaction between the first avatar 120 and the entity 118, the entity 118 may receive the digital card 124 and may then provide a second NFT 126 to the first avatar 120. The second NFT 126 may comprise a remaining portion of the user information 116 associated with the first user 108. In embodiments, the server 106 may generate the second NFT 126 to be broadcast to the first avatar 120, wherein the entity 118 may receive the generated second NFT 126 from the server 106. In other embodiments, the server 106 may be configured to operate as the entity 118 and may directly communicate with the first avatar 120. Generation of the second NFT 126 may occur in response to reception of the digital card 124. The server 106 may generate the second NFT 126 in response to receiving the digital card 124 from the entity 118 or from the first avatar 120.

Upon receiving the second NFT 126, the first avatar 120 may be provided a user interface for activating the physical card 112. The first user 108, through the first avatar 120, may provide user input to activate the physical card 112. The server 106 may receive the user input to activate the physical card 112 and may generate an activation NFT 128. The activation NFT 128 may be generated by combining the data corresponding to the first NFT 122 and the second NFT 126. In embodiments, the data corresponding to the first NFT 122 and the second NFT 126 may be data required to utilize a card in an interaction, which may be stored in the profile 114 of the first user 108. The server 106 may then transmit the activation NFT 128 and an instruction 130 to the first user device 104 to store the activation NFT 128 in the physical card 112. The first user device 104 may receive and display the instruction 130 to the first user 108. The first user 108 may bring the physical card 112 within physical proximity to the first user device 104 to re-establish the communication link, thereby allowing communications between each other. Once communicatively coupled, the first user device 104 may transmit the activation NFT 128 to the physical card 112 to be stored in the physical card 112. The physical card 112 may now be activated to authorize an interaction using the profile 114 corresponding to the first user 108.

The user interface may be configured to allow the first user 108 to limit how the physical card 112 is activated. For example, the activation NFT 128 may be configured to limit access to the profile 114 for a period of time. The first user 108 may provide a determined period of time (for example, 6 months) in which the physical card 112 is to be activated. The server 106 may receive this user input and generate the activation NFT 128 to terminate access to the profile 114 after the period of time has elapsed. In another example, the activation NFT 128 may be configured to limit access to the profile 114 to a location. The first user 108 may provide a general location (such as a country, city, or zip code) in which the physical card 112 is to be activated. The server 106 may receive this user input and generate the activation NFT 128 to terminate access to the profile 114 if the first user 108 is attempting to perform an interaction outside the boundaries of that general location. Alternatively, the first user 108 may provide a plurality of coordinates defining a geofence boundary. Each one of the plurality of coordinates may be a specific location, wherein the server 106 may connect adjacent coordinates to determine the geofence boundary. In this example, the activation NFT 128 may terminate access to the profile 114 if the first user 108 is attempting to perform an interaction outside the geofence boundary. In another example, the server 106 may determine if the first user 108 has provided a limit amount associated with usage of the physical card 112 to access profile 114. For example, the first user 108 may want to access profile 114 with physical card 112 up to a certain value. The server 106 may receive user input designating this limit amount and may generate the activation NFT 128 to terminate access to the profile 114 after that limit amount has been met.

The user interface may be further configured to allow the first user 108 to emboss the physical card 112 in the real-world environment. For example, the physical card 112 in the real-world environment may initially be lacking card information associated with that card, such as card number, expiration date, user identity, security code, and the like. The first user 108 may provide user input to emboss the physical card 112 with the card information. The server 106 may receive this user input and transmit an instruction 132 to the first user device 104 comprising embossing instructions. The first user 104 may be communicatively coupled to a 3D printer 134, via the communication network 110, and may forward the received instruction 132 to the 3D printer 134. The 3D printer 134 may then emboss the physical card 112 based on the receiving embossing instructions in instruction 132, wherein the embossed, physical card 112 may then be configured to display card information.

In embodiments, the server 106 may receive a request 136 to issue the physical card 112 to the first user 108. The server 106 may process this request 136 and generate the first NFT 122 for storage in the physical card 112. The server 106 may then initiate delivery of the physical card 112 to the first user 108. The server 106 may rely upon user action by first user 108 to proceed with an activation procedure to activate the physical card 112 for usage in an interaction. For example, the server 106 may generate the second NFT 126 needed to activate the physical card 112 in response to receiving the digital card 124 which is representative of the first NFT 122 within the virtual environment 102. The server 106 may then rely on additional user input to activate the physical card 112 by generating the activation NFT 128 to be stored on the physical card 112. The server 106 may further limit access to the profile 114 for activation NFT 128 based on a period of time, a location, and/or a limit amount.

The server 106 is generally a suitable server (e.g., including a physical server and/or virtual server) operable to store data in a memory 138 and/or provide access to application(s) or other services. The server 106 may be a backend server associated with a particular group that facilitates conducting interactions between entities and one or more users. Details of the operations of the server 106 are described in conjunction with FIG. 4. Memory 138 includes software instructions 140 that, when executed by a processor 142, cause the server 106 to perform one or more functions described herein. Memory 138 may be volatile or non-volatile and may comprise a read-only memory (ROM), random-access memory (RAM), ternary content-addressable memory (TCAM), dynamic random-access memory (DRAM), and static random-access memory (SRAM). Memory 138 may be implemented using one or more disks, tape drives, solid-state drives, and/or the like. Memory 138 is operable to store software instructions 140, user profiles 114, and/or any other data or instructions. The software instructions 140 may comprise any suitable set of instructions, logic, rules, or code operable to execute the processor 142. In these examples, the processor 142 may be communicatively coupled to the memory 138 and may access the memory 138 for these determinations.

Processor 142 comprises one or more processors operably coupled to the memory 138. The processor 142 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 142 can include any suitable data generation engine modules. The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 140. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1 and 4. For example, the processor 142 may be configured to perform the steps of method 400 as described in FIG. 4.

As illustrated, the server 106 may further comprise a network interface 144. Network interface 144 is configured to enable wired and/or wireless communications (e.g., via communication network 110). The network interface 144 is configured to communicate data between the server 106 and other devices (e.g., first user device 104, 3D printer 134, etc.), databases, systems, or domain(s). For example, the network interface 144 may comprise a WIFI interface, a local area network (LAN) interface, a wide area network (WAN) interface, a modem, a switch, or a router. The processor 142 is configured to send and receive data using the network interface 144. The network interface 144 may be configured to use any suitable type of communication protocol as would be appreciated by one of skill in the art.

The communication network 110 may facilitate communication within the system 100. This disclosure contemplates the communication network 110 being any suitable network operable to facilitate communication between the first user device 104, second user device 108, and the server 106. Communication network 110 may include any interconnecting system capable of transmitting audio, video, signals, data, messages, or any combination of the preceding. Communication network 110 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a POT network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network, operable to facilitate communication between the components of system 100. In other embodiments, system 100 may not have all of these components and/or may have other elements instead of, or in addition to, those above.

The first user device 104 may be any computing device configured to communicate with other devices, such as a server (e.g., server 106), databases, etc. through the communication network 110. The first user device 104 may be configured to perform specific functions described herein and interact with server 106, e.g., via its user interfaces. The first user device 104 is a hardware device that is generally configured to provide hardware and software resources to a user. Examples of a user device include, but are not limited to, a virtual reality device, an augmented reality device, a laptop, a computer, a smartphone, a tablet, a smart device, an Internet-of-Things (IoT) device, or any other suitable type of device. The user device may comprise a graphical user interface (e.g., a display), a touchscreen, a touchpad, keys, buttons, a mouse, or any other suitable type of hardware that allows a user to view data and/or to provide inputs into the user device. The first user device 104 may be configured to allow a user to send requests to the server 106 or to another user device.

Example User Device

FIG. 2 is a block diagram of an embodiment of the first user device 104 used by the system of FIG. 1. First user device 104 may be configured to display the virtual environment 102 (referring to FIG. 1) within a field of view of the first user 108 (referring to FIG. 1), capture biometric, sensory, and/or physical information of the first user 108 wearing the first user device 104, and to facilitate an electronic interaction between the first user 108 and the entity 118 (referring to FIG. 1). An example of the first user device 104 in operation is described in FIG. 4.

First user device 104 comprises a processor 202, a memory 204, and a display 206. Further embodiments may include a camera 208, a wireless communication interface 210, a network interface 212, a microphone 214, a global position system (GPS) sensor 216, and/or one or more biometric devices 218. First user device 104 may be configured as shown or in any other suitable configuration. For example, first user device 104 may comprise one or more additional components and/or one or more shown components may be omitted.

The processor 202 comprises one or more processors operably coupled to and in signal communication with memory 204, display 206, camera 208, wireless communication interface 210, network interface 212, microphone 214, GPS sensor 216, and biometric devices 218. Processor 202 is configured to receive and transmit electrical signals among one or more of memory 204, display 206, camera 208, wireless communication interface 210, network interface 212, microphone 214, GPS sensor 216, and biometric devices 218. The electrical signals are used to send and receive data (e.g., images captured from camera 208, virtual objects to display on display 206, etc.) and/or to control or communicate with other devices. Processor 202 may be operably coupled to one or more other devices (for example, the server 106 in FIG. 1). In embodiments, the processor 202 may utilize any suitable deep learning algorithm and/or protocols, machine learning algorithms, and the like.

The processor 202 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of those described with respect to FIGS. 1 and 4. For example, processor 202 may be configured to display virtual objects on display 206, detect hand gestures, identify virtual objects selected by a detected hand gesture (e.g., identify selected files), capture biometric information of a user, such as first user 108, via one or more of camera 208, microphone 214, and/or biometric devices 218, and communicate via wireless communication interface 210 with server 106. In some embodiments, the function described herein is implemented using logic units, FPGAs, ASICs, DSPs, or any other suitable hardware or electronic circuitry.

The memory 204 is operable to store any of the information described with respect to FIGS. 1 and 4 along with any other data, instructions, logic, rules, or code operable to implement the function(s) described herein when executed by processor 202. For example, the memory 204 may store the instructions and logic rules 220, which are described below with respect to FIG. 4. The memory 204 comprises one or more disks, tape drives, or solid-state drives, and may be used as an over-flow data storage device, to store programs when such programs are selected for execution, and to store instructions and data that are read during program execution. Memory 204 is operable to store, for example, instructions for performing the functions of first user device 104 described herein, and any other data or instructions. The memory 204 may be volatile or non-volatile and may comprise read-only memory (ROM), random-access memory (RAM), ternary content-addressable memory (TCAM), dynamic random-access memory (DRAM), and static random-access memory (SRAM).

Display 206 is configured to present visual information to a user (for example, first user 108 in FIG. 1) in an augmented reality environment that overlays virtual or graphical objects onto tangible objects in a real scene in real-time. In other embodiments, the display 206 is configured to present visual information to the user as the virtual environment 102 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of skill in the art upon viewing this disclosure. In another embodiment, display 206 is a graphical display on a user device. For example, the graphical display may be the display of a tablet or smart phone configured to display an augmented reality environment with virtual or graphical objects onto tangible objects in a real scene in real-time and/or virtual environment 102.

Examples of camera 208 include, but are not limited to, charge-coupled device (CCD) cameras and complementary metal-oxide semiconductor (CMOS) cameras. Camera 208 is configured to capture images of a wearer of first user device 104, such as first user 108. Camera 208 may be configured to capture images continuously, at predetermined intervals, or on-demand. For example, camera 208 may be configured to receive a command from first user 108 to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of skill in the art upon viewing this disclosure. Wireless communication interface 210 is configured to facilitate processor 202 in communicating with other devices. For example, wireless communication interface 210 is configured to enable processor 202 to send and receive signals with other devices, such as server 106 (referring to FIG. 1). Wireless communication interface 210 is configured to employ any suitable communication protocol.

The network interface 212 is configured to enable wired and/or wireless communications. The network interface 212 is configured to communicate data between the first user device 104 and other network devices, systems, or domain(s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of skill in the art.

Microphone 214 is configured to capture audio signals (e.g., voice signals or commands) from a user, such as first user 108. Microphone 214 is configured to capture audio signals continuously, at predetermined intervals, or on-demand. Microphone 214 is communicably coupled to processor 202.

GPS sensor 216 is configured to capture and to provide geographical location information. For example, GPS sensor 216 is configured to provide a geographic location of a user, such as first user 108, employing first user device 104. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners and fingerprint scanners. Biometric devices 218 are configured to capture information about a person's physical characteristics and to output a biometric signal based on captured information. A biometric signal is a signal that is uniquely linked to a person based on their physical characteristics. For example, biometric device 218 may be configured to perform a retinal scan of the user's eye and to generate a biometric signal for the user based on the retinal scan. As another example, a biometric device 218 is configured to perform a fingerprint scan of the user's finger and to generate a biometric signal for the user based on the fingerprint scan. Biometric device 218 is communicably coupled to processor 202.

Example Traffic Relay Message Flow for Operating the System

FIG. 3 is a traffic relay message flow diagram illustrating an example operation of the system 100 of FIG. 1. The illustrated traffic relay may be implemented using the first user device 104, the server 106, the physical card 112, and 3D printer 134 of FIG. 1. At operation 300, the first user 108 may transmit a request (such as request 136 in FIG. 1) to the server 106 for a new card (such as physical card 112).

During operation 302, the server 106 may receive the request and may generate the first NFT 122 (referring to FIG. 1) for storage in the physical card 112, where the first NFT 122 comprises card information and a portion of user information 116 (referring to FIG. 1) associated with the first user 108. The server 106 may transmit the generated first NFT 122 to the physical card 112. At operation 304, the physical card 112 may be delivered to the first user 108 in the real-world environment. In embodiments, the server 106 may initiate the delivery of the physical card 112 to first user 108.

Upon receiving the physical card 112, the first user 108 may attempt to activate the physical card 112 by conducting an interaction with the first avatar 120 (referring to FIG. 1) in the virtual environment 102. For example, the physical card 112 may require additional information in order to be activated, such as the remaining portion of user information 116. The first user 108 may enter into the virtual environment 102 to interact with the entity 118 (referring to FIG. 1) to receive the remaining portion of user information 116 in the form of the second NFT 126 (referring to FIG. 1). The entity 118 may provide the first user 108 with the second NFT 126 in response to receiving the first NFT 122 from the physical card 112.

At operation 306, the first user 108 may bring the physical card 112 within physical proximity to the first user device 104 (i.e., tapping the physical card 112 against the first user device 104). A communication link may be established between the physical card 112 and the first user device 104 thereby allowing communications between each other. In embodiments, the communication link may include near field communications protocols or Li-Fi protocols. Once communicatively coupled, the first user device 104 may receive the first NFT 122 from the physical card 112 that was previously generated by server 106 and stored in the physical card 112 during operation 308. At operation 310, in response to receiving the first NFT 122, the first user device 104 may transmit the first NFT 122 to the virtual environment 102 for use by the first avatar 120 in the interaction. In embodiments, the first NFT 122 may be displayed to the first user 108 during that virtual environment session as the digital card 124 (referring to FIG. 1), wherein the digital card 124 corresponds to the physical card 112 in the real-world environment. The digital card 124 may be generated based on the card information provided in the first NFT 122, wherein the visual appearance of the digital card 124 may be based on the provided card information.

At operation 312, the first user 108 may provide the digital card 124 to the entity 118 during an interaction. During operation 314, the entity 118 may transmit the digital card 124 and a request for the second NFT 126 to the server 106. In other embodiments, the server 106 may operate as the entity 118 and may generate the second NFT 126 in response to receiving the digital card 124 directly from the first avatar 120. At operation 316, the server 106 may generate the second NFT 126 to be broadcast to the first avatar 120. The server 106 may generate the second NFT 126 in response to receiving the digital card 124 from either the entity 118 or the first avatar 120. The entity 118 may receive the generated second NFT 126 from the server 106 and forward the second NFT 126 to the first avatar 120. In other embodiments, the server 106 may directly communicate with the first avatar 120 and transmit the second NFT 126 to first avatar 120.

At operation 318, upon receiving the second NFT 126, the first avatar 120 may be provided a user interface for activating the physical card 112. The first user 108, through the first avatar 120, may then provide user input to activate the physical card 112. The server 106 may receive the user input to activate the physical card 112 and may generate the activation NFT 128 (referring to FIG. 1). The activation NFT 128 may be generated by combining the data corresponding to the first NFT 122 and the second NFT 126. In embodiments, the data corresponding to the first NFT 122 and the second NFT 126 may be data required to utilize a card in an interaction, which may be stored in the profile 114 of the first user 108. The server 106 may then transmit the activation NFT 128 and the instruction 130 (referring to FIG. 1) to the first user device 104 to store the activation NFT 128 in the physical card 112. The first user device 104 may receive and display the instruction 130 to the first user 108. The first user 108 may bring the physical card 112 within physical proximity to the first user device 104 to re-establish the communication link, thereby allowing communications between each other. Once communicatively coupled, the first user device 104 may transmit the activation NFT 128 to the physical card 112 to be stored in the physical card 112. The physical card 112 may now be active to authorize an interaction using the profile 114 corresponding to the first user 108.

At operation 320, the first user 108 may optionally emboss the physical card 112 in the real-world environment. The first user 108 may provide user input to the server 106 for embossing the physical card 112 with the card information. The server 106 may receive this user input and transmit the instruction 132 (referring to FIG. 1) to the first user device 104 comprising embossing instructions. The first user 104 may be communicatively coupled to the 3D printer 134 and may forward the received instruction 132 to the 3D printer 134. The 3D printer 134 may then emboss the physical card 112 based on the received embossing instructions in instruction 132.

Example Operation of the Server for Activating a Physical Card Leveraging a Virtual Environment FIG. 4 is a flow diagram illustrating an example method 400 of the system 100 of FIG. 1. The method 400 may be implemented using the first user device 104 and the server 106 of FIG. 1. The method 400 may begin at operation 402 where the processor 142 (referring to FIG. 1) of the server 106 may receive the request 136 (referring to FIG. 1) to issue the physical card 112 (referring to FIG. 1) to the first user 108 (referring to FIG. 1). The request 136 may be transmitted by any suitable device controlled by the first user 108.

At operation 404, in response to receiving the request 136, the processor 142 of server 106 may generate the first NFT 122 (referring to FIG. 1), wherein the first NFT 122 comprises card information and a portion of user information 116 (referring to FIG. 1) associated with the first user 108. The user information 116 may be stored within the profile 114 (referring to FIG. 1) corresponding to the first user 108 within the memory 138 (referring to FIG. 1) of the server 106. In embodiments, the processor 142 of server 106 may further transmit or send the generated first NFT 122 to the physical card 112 for storage in the physical card 112. For example, the physical card 112 may comprise certain components capable to facilitate an electronic interaction between another device, such as a memory and a processor. In this example, the memory and processor of physical card 112 may operate similarly to memory 138 and processor 142. Once the first NFT 112 is stored in the physical card 112, the processor 142 of server 106 may initiate delivery of the physical card 112 to the first user 108.

At operation 406, in response to user action taken by the first user 108, the processor 142 of the server 106 may generate another NFT (i.e., second NFT 126) associated with the first NFT 122. For example, the first user 108 may be required to perform certain actions to activate the physical card 112 for usage in an interaction. The server 106 may also be configured to perform certain actions to activate the physical card 112, but these actions are in reliance of the actions of the first user 108. In an example, the first user 108 may engage in an interaction with the entity 118 in the virtual environment 102 (referring to FIG. 1) to activate the physical card 112 in the real-world environment. This interaction may include the first avatar 120 (referring to FIG. 1), operated by first user 108, requesting the second NFT 126 from the entity 118, and the entity 118 may provide the second NFT 126 to the first avatar 120 in response to receiving the first NFT 122. In embodiments, the first NFT 122 comprises user information 116 identifying the first user 108, and the server 106 may generate the second NFT 126 based, at least in part, on the identity of the first user 108.

In this example, the entity 118 may transmit a request to receive the first NFT 122 from the first avatar 120. The first user device 104 may receive and display the request to the first user 108. The first user 108 may upload the first NFT 122 from the physical card 112 to the virtual environment 102 for use during the interaction with the entity 118. The first user 108 may bring the physical card 112 within physical proximity to the first user device 104. A communication link may be established between the physical card 112 and the first user device 104 thereby allowing communications between each other (i.e., near field communications protocols or Li-Fi protocols). Once communicatively coupled, the first user device 104 may receive the first NFT 122 from the physical card 112 that was generated by server 106 and stored in the physical card 112 during operation 404. In response to receiving the first NFT 122, the first user device 104 may transmit the first NFT 122 to the virtual environment 102 for use by the first avatar 120 in the interaction. The first user device 104 may then assign the first NFT 122 to the first avatar 120. The first NFT 122 may be displayed to the first user 108 during that virtual environment session as a digital card 124, wherein the digital card 124 corresponds to the physical card 112 in the real-world environment. The digital card 124 may be generated based on the card information provided in the first NFT 122, wherein the visual appearance of the digital card 124 may be based on the provided card information.

During the interaction between the first avatar 120 and the entity 118, the entity 118 may receive the digital card 124 and may send the digital card 124 to the server 106. In embodiments, the server 106 may generate the second NFT 126 to be broadcast to the first avatar 120, wherein the entity 118 may receive the generated second NFT 126 from the server 106. In other embodiments, the server 106 may be configured to operate as the entity 118 and may directly communicate with the first avatar 120. Generation of the second NFT 126 may occur in response to reception of the digital card 124 from first avatar 120. The server 106 may generate the second NFT 126 in response to receiving the digital card 124 from the entity 118 or from the first avatar 120.

At operation 408, the processor 142 of server 106 may receive user input to activate the physical card 112. The processor 142 may generate the activation NFT 128 based on the received user input from the first user 108. The activation NFT 128 may be generated by combining the data corresponding to the first NFT 122 and the second NFT 126.

In embodiments, the data corresponding to the first NFT 122 and the second NFT 126 may be data required to utilize a card in an interaction, which may be stored in the profile 114 of the first user 108.

At operation 410, the processor 142 of server 106 may limit access to the profile 114 from the physical card 112 based on the user input received during operation 408. The processor 142 of server 106 may generate the activation NFT 128 to include optional limits designated by the first user 108. For example, the activation NFT 128 may be configured to limit access to the profile 114 for a period of time. The first user 108 may provide a determined period of time (for example, 6 months) in which the physical card 112 is to be activated. The processor 142 of server 106 may receive this user input during operation 408 and generate the activation NFT 128 to terminate access to the profile 114 after the period of time has elapsed.

In another example, the activation NFT 128 may be configured to limit access to the profile 114 to a location. The first user 108 may provide a general location (such as a country, city, or zip code) in which the physical card 112 is to be activated. The processor 142 of server 106 may receive this user input during operation 408 and generate the activation NFT 128 to terminate access to the profile 114 if the first user 108 is attempting to perform an interaction outside the boundaries of that general location.

Alternatively, the first user 108 may provide a plurality of coordinates defining a geofence boundary. Each one of the plurality of coordinates may be a specific location, wherein the processor 142 of server 106 may connect adjacent coordinates to determine the geofence boundary. In this example, the activation NFT 128 may terminate access to the profile 114 if the first user 108 is attempting to perform an interaction outside the geofence boundary. In another example, the processor 142 of server 106 may determine if the first user 108 has provided a limit amount associated with usage of the physical card 112 to access profile 114. For example, the first user 108 may want to access profile 114 with physical card 112 up to a certain value. The processor 142 of server 106 may receive user input designating this limit amount and may generate the activation NFT 128 to terminate access to the profile 114 after that limit amount has been met. In other examples, the first user 108 may not provide user input to limit access to the profile 114.

At operation 412, the processor 142 of server 106 may transmit the activation NFT 128 and instruction 130 (referring to FIG. 1) to the first user device 104 to store the activation NFT 128 in the physical card 112. The first user device 104 may receive and display the instruction 130 to the first user 108. The first user 108 may bring the physical card 112 within physical proximity to the first user device 104 to re-establish the communication link, thereby allowing communications between each other. Once communicatively coupled, the first user device 104 may transmit the activation NFT 128 to the physical card 112 to be stored in the physical card 112. The physical card 112 may now be activated to authorize an interaction using the profile 114 corresponding to the first user 108.

At operation 414, the processor 142 of server 106 may determine if there was user input to emboss the physical card 112 in the real-world environment. If there is a determination of receiving user input to emboss the physical card 112, the method 400 may proceed to operation 416. Otherwise, the method 400 may proceed to end.

At operation 416, in response to a determination that there was user input during operation 408 to emboss the physical card 112 in the real-world environment, the processor 142 of the server 106 may transmit the instruction 132 (referring to FIG. 1) to the first user device 104 comprising embossing instructions. The first user 104 may be communicatively coupled to the 3D printer 134 (referring to FIG. 1) and may forward the received instruction 132 to the 3D printer 134. The 3D printer 134 may then emboss the physical card 112 based on the received embossing instructions in instruction 132. Then, the method 400 may proceed to end.

While several embodiments have been provided in the present disclosure, it should be understood that the disclosed systems and methods might be embodied in many other specific forms without departing from the spirit or scope of the present disclosure. The present examples are to be considered as illustrative and not limiting, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 106(f) as it exists on the date of filing hereof unless the words "means for" or "step for" are explicitly used in the particular claim.

The invention claimed is:

1. An apparatus for activating a physical card in a virtual environment, comprising:
   a memory operable to:
      store a profile associated with a first user comprising user information; and
   a processor, operably coupled to the memory, configured to:
      receive a request to issue the physical card to the first user;
      generate a first non-fungible token (NFT) for storage in the physical card, wherein the first NFT comprises card information and a portion of the user information associated with the first user,
         wherein the first NFT is uploaded to a first user device associated with the first user through a communication link established between the first user device and the physical card, wherein the first NFT is displayed as a digital card in the virtual environment, wherein the digital card corresponds to the physical card;
      receive the digital card in an interaction with a first avatar associated with the first user;
      generate a second NFT comprising a remaining portion of the user information associated with the first user in response to receiving the digital card;
      combine the first NFT and the second NFT to generate an activation NFT, wherein the activation NFT is configured to allow the physical card to access the profile during an interaction; and transmit the activation NFT and an instruction to the first user device to store the activation NFT in the physical card.

2. The apparatus of claim 1, wherein the communication link is established using wireless protocols to transmit the first NFT to the first user device.

3. The apparatus of claim 1, wherein the processor is further configured to:
limit access to the profile for a period of time during generation of the activation NFT.

4. The apparatus of claim 1, wherein the processor is further configured to:
limit access to the profile to a location within a geofencing boundary during generation of the activation NFT, wherein the geofencing boundary is determined by a plurality of coordinates; and
receive the plurality of coordinates to determine the geofencing boundary.

5. The apparatus of claim 1, wherein the processor is further configured to:
receive user input for a limit amount associated with usage of the physical card; and
limit access to the profile up to the limit amount during generation of the activation NFT.

6. The apparatus of claim 1, wherein the user information comprises profile information associated with the profile of the first user, device information associated with the first user device, an address associated with the first user, and user credentials associated with the first user accessing the virtual environment.

7. The apparatus of claim 1, wherein the processor is further configured to:
transmit an instruction to the first user device to transmit embossing instructions to a three-dimensional (3D) printer to emboss the physical card, wherein the first user device is communicatively coupled to the 3D printer.

8. A method for activating a physical card in a virtual environment, comprising:
receiving a request to issue the physical card to a first user;
generating a first non-fungible token (NFT) for storage in the physical card, wherein the first NFT comprises card information and a portion of user information associated with the first user,
wherein the first NFT is uploaded to a first user device associated with the first user through a communication link established between the first user device and the physical card, wherein the first NFT is displayed as a digital card in the virtual environment, wherein the digital card corresponds to the physical card;
receiving the digital card in an interaction with a first avatar associated with the first user;
generating a second NFT comprising a remaining portion of the user information associated with the first user in response to receiving the digital card;
combining the first NFT and the second NFT to generate an activation NFT, wherein the activation NFT is configured to allow the physical card to access a profile corresponding to the first user during an interaction; and
transmitting the activation NFT and an instruction to the first user device to store the activation NFT in the physical card.

9. The method of claim 8, wherein the communication link is established using wireless protocols to transmit the first NFT to the first user device.

10. The method of claim 8, further comprising limiting access to the profile for a period of time during generation of the activation NFT.

11. The method of claim 8, further comprising:
limiting access to the profile to a location within a geofencing boundary during generation of the activation NFT, wherein the geofencing boundary is determined by a plurality of coordinates; and
receiving the plurality of coordinates to determine the geofencing boundary.

12. The method of claim 8, further comprising:
receiving user input for a limit amount associated with usage of the physical card; and
limiting access to the profile up to the limit amount during generation of the activation NFT.

13. The method of claim 8, wherein the user information comprises profile information associated with the profile of the first user, device information associated with the first user device, an address associated with the first user, and user credentials associated with the first user accessing the virtual environment.

14. The method of claim 8, further comprising:
transmitting an instruction to the first user device to transmit embossing instructions to a three-dimensional (3D) printer to emboss the physical card, wherein the first user device is communicatively coupled to the 3D printer.

15. A non-transitory computer-readable medium comprising instructions that are configured, when executed by a processor, to:
receive a request to issue a physical card to a first user;
generate a first non-fungible token (NFT) for storage in the physical card, wherein the first NFT comprises card information and a portion of user information associated with the first user,
wherein the first NFT is uploaded to a first user device associated with the first user through a communication link established between the first user device and the physical card, wherein the first NFT is displayed as a digital card in the virtual environment, wherein the digital card corresponds to the physical card;
receive the digital card in an interaction with a first avatar associated with the first user;
generate a second NFT comprising a remaining portion of the user information associated with the first user in response to receiving the digital card;
combine the first NFT and the second NFT to generate an activation NFT, wherein the activation NFT is configured to allow the physical card to access a profile corresponding to the first user during an interaction; and
transmit the activation NFT and an instruction to the first user device to store the activation NFT in the physical card.

16. The non-transitory computer-readable medium of claim 15, wherein the communication link is established using wireless protocols to transmit the first NFT to the first user device.

17. The non-transitory computer-readable medium of claim 15, wherein the user information comprises profile information associated with the profile of the first user, device information associated with the first user device, an address associated with the first user, and user credentials associated with the first user accessing the virtual environment.

18. The non-transitory computer-readable medium of claim 15, wherein the instructions are further configured to:

limit access to the profile for a period of time during generation of the activation NFT.

19. The non-transitory computer-readable medium of claim 15, wherein the instructions are further configured to:
limit access to the profile to a location within a geofencing boundary during generation of the activation NFT, wherein the geofencing boundary is determined by a plurality of coordinates; and
receive the plurality of coordinates to determine the geofencing boundary.

20. The non-transitory computer-readable medium of claim 15, wherein the instructions are further configured to:
receive user input for a limit amount associated with usage of the physical card; and limit access to the profile up to the limit amount during generation of the activation NFT.

* * * * *